United States Patent
Fai et al.

(10) Patent No.: US 8,966,319 B2
(45) Date of Patent: Feb. 24, 2015

(54) OBTAINING DEBUG INFORMATION FROM A FLASH MEMORY DEVICE

(75) Inventors: Anthony Fai, Palo Alto, CA (US); Nir Jacob Wakrat, Los Altos, CA (US); Nicholas Seroff, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 698 days.

(21) Appl. No.: 13/032,541

(22) Filed: Feb. 22, 2011

(65) Prior Publication Data
US 2012/0216079 A1    Aug. 23, 2012

(51) Int. Cl.
*G06F 11/00*    (2006.01)
*G06F 11/36*    (2006.01)

(52) U.S. Cl.
CPC ..................... *G06F 11/362* (2013.01)
USPC .......................................................... 714/42

(58) Field of Classification Search
USPC .......................................................... 714/42
See application file for complete search history.

(56) References Cited

U.S. PATENT DOCUMENTS

| | | | | |
|---|---|---|---|---|
| 6,075,941 A * | 6/2000 | Itoh et al. | ........................ | 717/128 |
| 6,662,314 B1 * | 12/2003 | Iwata et al. | ..................... | 714/42 |
| 6,892,324 B1 * | 5/2005 | French et al. | ............... | 714/38.14 |
| 7,213,216 B2 * | 5/2007 | Ng et al. | ....................... | 716/103 |
| 7,386,774 B1 | 6/2008 | Chatterjee et al. | | |
| 7,447,942 B2 * | 11/2008 | Chen et al. | .................. | 714/38.13 |
| 7,475,287 B2 * | 1/2009 | Shin et al. | ........................ | 714/27 |
| 7,665,046 B2 * | 2/2010 | Ng et al. | ........................... | 326/37 |
| 7,765,526 B2 * | 7/2010 | Chen et al. | .................... | 717/124 |
| 7,861,122 B2 * | 12/2010 | Cornwell et al. | ................. | 714/42 |
| 7,908,521 B2 * | 3/2011 | Sridharan et al. | ............. | 714/47.1 |
| 7,913,118 B2 * | 3/2011 | Shih et al. | ........................ | 714/28 |
| 8,010,774 B2 * | 8/2011 | Kapustin et al. | ............... | 712/227 |
| 8,423,829 B2 * | 4/2013 | Yamagata et al. | ............... | 714/33 |
| 8,799,863 B2 * | 8/2014 | Alpern | .......................... | 717/124 |
| 2002/0065646 A1 | 5/2002 | Waldie et al. | | |
| 2006/0129885 A1 * | 6/2006 | Bozak et al. | ..................... | 714/15 |
| 2007/0079292 A1 * | 4/2007 | Chen et al. | ..................... | 717/127 |

* cited by examiner

*Primary Examiner* — Amine Riad
(74) *Attorney, Agent, or Firm* — Meyertons, Hood, Kivlin, Kowert & Goetzel, P.C.; Stephen J. Curran

(57) ABSTRACT

This document generally describes systems, devices, methods, and techniques for obtaining debug information from a memory device. Debug information can include a variety of information associated with a memory device that can be used for debugging the device, such as a sequence of operations performed by the memory device and information regarding errors that have occurred (e.g., type of error, component of memory device associated with error). A memory device can be instructed by a host to obtain and provide debug information to the host. A memory device can be configured to obtain particular debug information using a variety of features, such as triggers. For instance, a memory device can use a trigger to collect debug information related to failed erase operations.

26 Claims, 5 Drawing Sheets

OBTAINING DEBUG INFORMATION FROM A FLASH MEMORY DEVICE

TECHNICAL FIELD

This document generally describes devices, systems, techniques, and methods for obtaining debug information from a memory device.

BACKGROUND

Various types of non-volatile memory (NVM), such as flash memory (e.g., NAND flash memory, NOR flash memory), can be used for mass storage. For example, consumer electronics (e.g., portable media players) use flash memory to store data, such as music, videos, images, and other media.

Memory controllers can be used to perform memory operations (e.g., program, read, erase) on NVM. Memory controllers can include a variety of components, such as processors, microprocessors, instructions (e.g., software-based program), hardware-based components (e.g., application-specific integrated circuits (ASICs)), volatile memory (e.g., random access memory (RAM)), or any combination thereof. A single memory controller can access multiple units of NVM, such as multiple memory dies (e.g., NAND flash memory dies), over a shared communications channel, such as a shared internal bus. For example, a shared bus can connect each of a plurality of flash memory dies to a memory controller and can be used by such a memory controller to perform memory operations on each of the flash memory dies.

SUMMARY

This document generally describes systems, devices, methods, and techniques for obtaining debug information from a memory device. Debug information can include a variety of information associated with a memory device that can be used for debugging the device, such as a sequence of operations performed by the memory device and information regarding errors that have occurred (e.g., type of error, component of memory device associated with error). A memory device can be instructed by a host to obtain and provide debug information to the host. A memory device can be configured to obtain particular debug information using a variety of features, such as triggers. For instance, a memory device can use a trigger to collect debug information related to failed erase operations.

In one implementation, a method includes receiving, from a host through a host interface of a memory device, a command instructing the memory device to obtain debug information associated with the memory device, wherein the memory device includes non-volatile memory. The method can also include collecting, by a memory controller of the memory device, debug information during operation of the memory device in response to receiving the command. The method can also include providing at least a portion of the collected debug information to the host through the host interface.

In another implementation, a method includes transmitting, by a host, a command to a memory device that includes a memory controller and non-volatile memory, wherein the command instructs the memory device to collect debug information associated with the memory device. The method can also include receiving, at the host, at least a portion of the debug information collected by the memory device in response to the command. The method can additionally include performing, by the host, one or more operations in response to the received debug information.

In another implementation, a memory device includes non-volatile memory, a host interface that communicatively connects the memory device to a host, and a memory controller that is configured to perform memory operations on the non-volatile memory and that communicates with the host through the host interface. The memory controller can be further configured to receive, from the host through the host interface, a command to obtain debug information associated with the memory device and the non-volatile memory. The memory controller can also be configured to collect debug information during operation of the memory device in response to receiving the command, and provide at least a portion of the collected debug information to the host through the host interface.

In another implementation, a system includes non-volatile memory and a memory controller that is configured to perform memory operations on the non-volatile memory and that communicates with a host through a host interface. The memory controller can further be configured to receive, from the host through the host interface, a command to obtain debug information associated with the memory device and the non-volatile memory. The memory controller can also be configured to collect debug information during operation of the memory device in response to receiving the command, and to provide at least a portion of the collected debug information to the host through the host interface.

Various advantages can be provided. For example, more detailed information regarding the operation of a memory device can be obtained than is conventionally provided by memory devices. For instance, memory devices may not be configured to provide much, if any, debug information to a host. This document allows for detailed debug information to be provided to a host. In another example, a host can obtain specific debug information from a memory device, such as debug information pertaining to a particular memory address and/or debug information regarding a specific memory operation. In a further example, failure analysis can be performed more quickly based on the availability of more detailed debug information. In another example, new memory devices can be brought-up (e.g., booted) faster based on more information regarding such memory devices, like debug information, being shared between host and device controllers. In a further example, instead of having to reproduce an error and/or physically ship a malfunctioning device to a third party for failure analysis, debug information generated during an error/failure can be easily obtained and provided to third parties to more easily facilitate failure analysis. In another example, debug information can be used as test code by a host. For instance, a host can set various triggers as test code for a memory device, which can cause the memory device to report debug data for the test code (triggers).

The details of one or more embodiments are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

This document generally describes systems, devices, methods, and techniques for obtaining debug information from a memory device, such as a NVM memory package that includes a memory controller and NVM. Debug information is information that can be used to debug a memory device, such as a sequence of memory operations performed by the device and errors incurred during operation of the device. A host, such as a consumer electronic device to which a memory device (e.g., NVM package) is connected, can request and obtain debug information from a memory device. A memory device can collect and provide specific debug information to a host, such as debug information related to particular NVM addresses.

Figure 1:
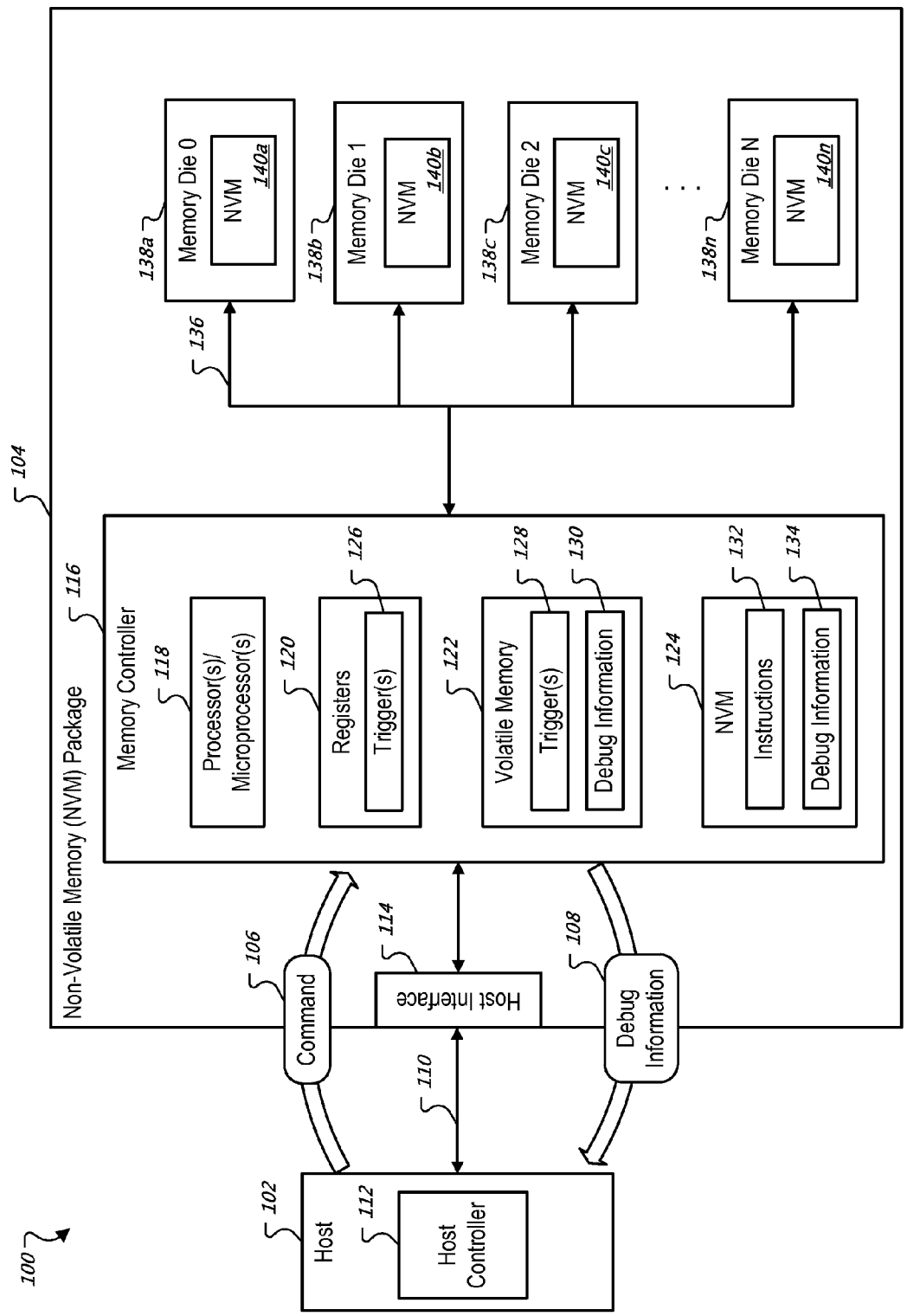
FIG. 1 is a diagram depicting an example system that includes a host and a NVM package that is configured to obtain and provide debug information to the host.

FIG. 1 is a diagram depicting an example system 100 that includes a host 102 and a NVM package 104 that is configured to obtain and provide debug information to the host 102. For instance, as depicted in the example system 100, the host 102 can provide a command 106 for the NVM package 104 to collect debug information. In response, the NVM package 104 can collect debug information requested by the host 102 and can provide the collected debug information 108 to the host 102.

The host 102 can be any of a variety of host devices and/or systems, such as a portable media player, a cellular telephone, a pocket-sized personal computer, a personal digital assistant (PDA), a desktop computer, a laptop computer, and/or a tablet computing device. The NVM package 104 includes NVM and can be a ball grid array package or other suitable type of integrated circuit (IC) package. The NVM package 104 can provide debug information to the host 102 through a connection 110 to the host 102. The NVM package 104 can be part of and/or separate from the host 102.

The host 102 can include a host controller 112 that is configured to interact with the NVM package 104 to obtain debug information from the NVM package 104. The host controller 112 can include one or more processors and/or microprocessors that are configured to perform operations based on the execution of software and/or firmware instructions. Additionally and/or alternatively, the host controller 112 can include hardware-based components, such as ASICs, that are configured to perform various operations. Operations performed by the host controller 112 can include requesting, receiving, and analyzing debug information from the NVM package 104. For example, the host controller 112 can provide the command 106 to the NVM package 104 and, in response, can receive the debug information 108. The host controller 112 can format the command 106 to indicate the host 102 is requesting debug information according to a communications protocol used between the host 102 and the NVM package 104.

The host 102 can communicate with the NVM package 104 over the connection 110. The connection 110 between the host 102 and the NVM package 104 the can be fixed (e.g., fixed communications channel) and/or detachable (e.g., a universal serial bus (USB) port). Interactions with the NVM package 104 can include providing debug information and memory operation related requests to the NVM package 104, such as the command 106 and requests to retrieve/store data in the NVM package 104.

The NVM package 104 can interact with the host 102 over the connection 110 using a host interface 114 and a memory controller 116. Like the host controller 112, the memory controller 116 can include one or more processors and/or microprocessors 118 that are configured to perform operations based on the execution of software and/or firmware instructions. Additionally and/or alternatively, the memory controller 116 can include hardware-based components, such as ASICs, that are configured to perform various operations. The memory controller 116 can perform a variety of operations, such as collecting debug information requested by the host 102. For example, in response to receiving the command 106 to obtain debug information, the memory controller 116 can identify debug information (e.g., memory operations, error information) that is relevant to the command 106 and can provide the debug information to the host 102 using the host interface 108.

Various memory management functions, such as error correction and wear leveling, can be performed by the host controller 112 and the memory controller 116, alone or in combination. In implementations where the memory controller 116 is configured to perform at least some memory management functions, the NVM package 104 can be termed "managed NVM" (or "managed NAND" for NAND flash memory). This can be in contrast to "raw NVM" (or "raw NAND" for NAND flash memory), in which the host controller 112 external to the NVM package 104 performs memory management functions for the NVM package 104.

The memory controller 116 is depicted as including registers 120, volatile memory 122, and NVM 124. The registers 120 can be accessible as part of and/or separate from by the processor(s)/microprocessor(s) 118. The registers 120 can include any of a variety of synchronous circuits that are able to clock data in and out based on one or more clock signals of the processor(s)/microprocessor(s) 118. The registers 120 can be used by the processor(s)/microprocessor(s) 118 to perform memory operations on the NVM package 104. The registers 120 can be used in a variety of capacities, such as storing data, addresses, instructions, conditions, and status information. A portion of the registers 120 can be used to store information regarding one or more triggers 126 that are used to determine when to collect debug information. For instance, the triggers 126 can be configured to monitor for memory operations pertaining to a particular portion (e.g., page, block) of NVM and, in response to identifying such a memory operation, to cause the processor(s)/microprocessor(s) 118 to log associated debug information in the volatile memory 122 and/or the NVM 124.

The trigger(s) 126 can be set, modified, and/or removed by the host 102 through a command between the host 102 and the NVM package 104, like the command 106. For instance, the host 102 may initially instruct the NVM package 104 to set triggers to monitor for and log debug information related to out of range memory operations. However, if the host 102 identifies data errors with regard to a particular file (e.g., media file) stored on the NVM package 104, the host 102 can send a subsequent command to the NVM package 104 to obtain debug information associated with blocks of NVM that store at least a portion of the particular file. In response to the subsequent command from the host 102, the memory controller 116 can modify the triggers 126 to include one or more triggers to be set to additional monitor for and log debug information related to the particular file.

The volatile memory 122 can be any of a variety of volatile memory types, such as cache memory and RAM. The volatile memory 112 can be used by the memory controller 116 to perform memory operations and/or to temporarily store data that is being read from and/or written to NVM. For example, the volatile memory 122 can store information regarding one or more triggers 128 and/or debug information 130. The triggers 128 can be used by the processor(s)/microprocessor(s) 118, alone or in combination with the trigger(s) 126, to determine when to collect debug information during operation of the NVM package 104. Debug information can be logged to the volatile memory 122 by the memory controller 116, as depicted by the debug information 130.

The debug information 130 can be used by the NVM package 104 in a variety of ways. For instance, the debug information 130 can be provided from the volatile memory 122 to the host 102 using the host interface 114 as the debug information 130 is collected. In another example, the debug information 130 can be flushed to the NVM 124 and/or other NVM of the NVM package 104 (e.g., write the debug information 130 when a page/block of information has been collected).

In another example, the debug information 130 can include a temporary log of a particular number of operations (e.g., 10 operations, 20 operations, 50 operations, etc.) performed by the NVM package 104. Such a temporary log can be used to provide context to a state of the NVM package 104 when an error occurs. For instance, if the previous 20 operations are continually logged in the volatile memory 122 (e.g., continually write most recent memory operation to volatile memory location storing debug information regarding the oldest operation included in the temporary log) and an error (or other trigger event) is encountered, information regarding the previous 20 operations can be provided to the host 102 and/or flushed to NVM in the memory package 104 to indicate conditions existing in the package 104 that may have precipitated the error/trigger event.

The NVM 124 can be any of a variety of NVM and can store instructions 116 that the memory controller 116 uses to perform a variety of operations, including instructions to determine when to collect debug information and a type of debug information to be collected. The NVM 124 can store debug information collected by the memory controller 116, as depicted by the debug information 134.

The memory controller 116 uses a shared internal bus 136 to access NVM used for persistent data storage. In the example system 100, such NVM is depicted as including multiple memory dies 138a-n that include NVMs 140a-n. The memory dies can be a variety of memory dies, such as integrated circuit (IC) dies. Although only the single shared bus 118 is depicted with regard to the NVM package 104, an NVM package can include more than one shared internal bus. Each internal bus can be connected to multiple memory dies (e.g., 2, 3, 4, 8, 32, etc.), as depicted with regard to the multiple memory dies 138a-n. The memory dies 138a-n can be physically arranged in a variety of configurations, such as being stacked. The NVM 140a-n can be any of a variety of NVM, such as NAND flash memory based on floating gate or charge trapping technology, NOR flash memory, erasable programmable read only memory (EPROM), electrically erasable programmable read only memory (EEPROM), ferroelectric RAM (FRAM), magnetoresistive RAM (MRAM), phase change memory (PCM), or any combination thereof.

The memory controller 116 can be configured, through software/firmware instructions (e.g., the instructions 132), hardware-based components (e.g., ASICs), and/or commands from the host 102 (e.g., the command 106), to collect debug information regarding the memory dies 138a-n and the NVM 140a-n, as described above. For instance, the memory controller 116 can be configured to obtain debug information regarding a page of the NVM 140a of the memory die 0 (138a). The NVM 140a-n can store debug information collected by the memory controller 116 in conjunction with, or instead of, the debug information 130 and/or the debug information 134.

In one example of debug information collection using the system 100, the host 102 can provide the command 106 to the NVM package 104 to obtain debug information related to read operation failures. Based on the command 106, the memory controller 116 can set one or more triggers in the registers 120 and/or the volatile memory 122 (triggers 126 and/or 128). The memory controller 116 can perform memory operations on the memory dies 138a-n using the internal bus 136 and, when a read operation failure is detected using the triggers 126 and/or 130, debug information can be collected. The debug information can include a variety of details regarding the read failure, such as a physical address associated with the failure (e.g., page identifier, block identifier, die identifier), status information for the NVM package 104 during the read operation (e.g., temperature, available voltage, etc.), and/or other operations performed before the read failure. The debug information can be stored in the volatile memory 122 (the debug information 130), in the NVM 124 (the debug information 134), and/or in the NVM 140a-n. The collected debug information can be provided to the host 102 over the connection 110 as it is collected and/or in response to a command from the host 102 to provide debug information collected according to previous monitoring requests from the host 102 (e.g., the command 106). A predetermined protocol can be used to identify and communicate debug information between the NVM package 104 and the host 102.

Figure 2:
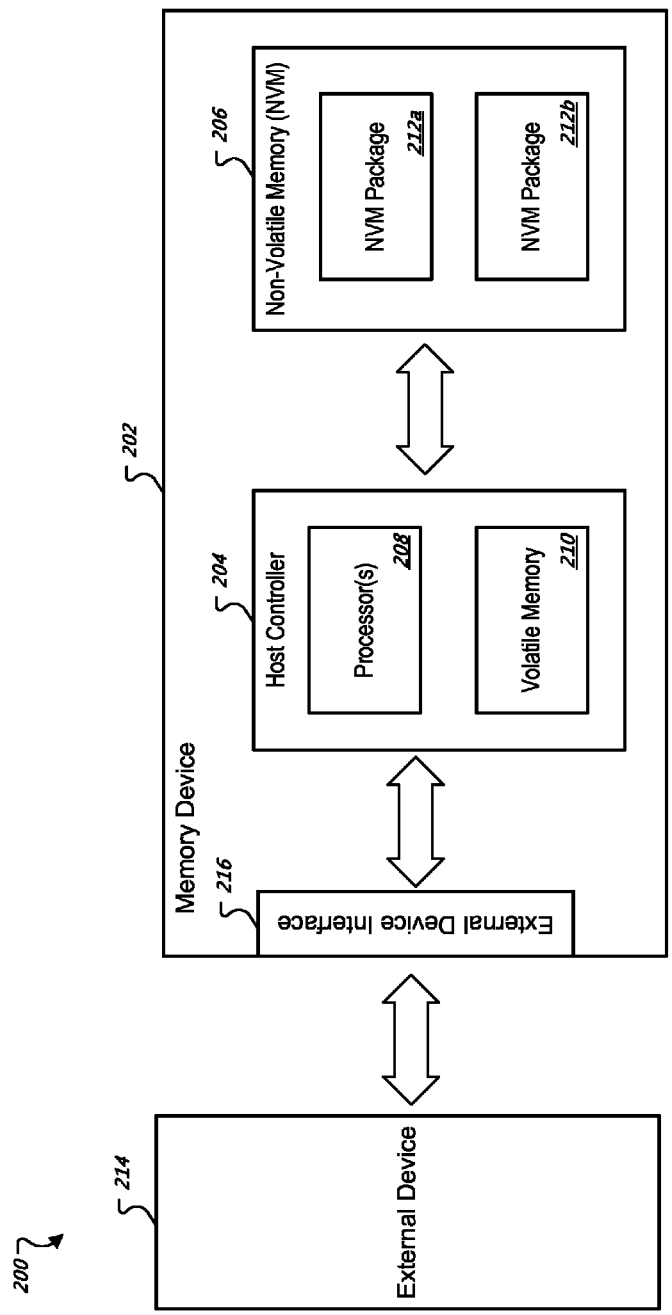
FIG. 2 is a diagram depicting an example system that includes a memory device configured to obtain debug information.

FIG. 2 is a diagram depicting an example system 200 that includes a memory device 202 configured to obtain debug information. The memory device 202 can be any of a variety of memory devices, such as a portable media player (e.g., an IPOD), a cellular telephone (e.g., an IPHONE), a pocket-sized personal computer, a personal digital assistant (PDA), a desktop computer, a laptop computer, a tablet computing device (e.g., an IPAD), and/or a removable/portable storage device (e.g., a flash memory card, a USB flash memory drive).

The example memory device 202 is depicted as including a host controller 204 and NVM 206. The host controller 204 can be similar to the host controller 112 described above with regard to FIG. 1. The host controller 204 includes one or more processors 208 and volatile memory 210. The processors 208 can be any variety of processors, such as microprocessors, central processing units (CPUs), graphics processing units (GPUs), or any combination thereof. The volatile memory 210 can be similar to the volatile memory 122 described above with regard to FIG. 1. The volatile memory 210 can be used by the processors 208 to perform various operations, such as retrieving and processing data stored in the NVM 206.

The NVM 206 can include one or more NVM packages 212a-b. The NVM packages 212a-b can each be similar to the NVM package 104 described above with regard to FIG. 1. For instance, the NVM packages 212a-b can each include a plurality of memory dies with NVM (e.g., memory dies 138a-n and NVM 140a-n) and one or more memory controllers (e.g., memory controller 116) that are configured to collect debug information associated with the NVM packages 212a-b. Each of the NVM packages 212a-b can collect and provide debug information requested by the host controller 204, The NVM 206 can include any number of NVM packages (e.g., 2, 3, 4, 8, 16, etc.).

As described above with regard to FIG. 1, management of the NVM can be performed by the host controller 204 and/or controllers of the NVM packages 212a-b. For instance, the host controller 204 can be configured to adjust operation of the NVM packages 212a-b based on the debug information provided to the host controller 204 by the NVM packages 212a-b. In implementations where controllers of the NVM packages 212a-b control at least a portion of the memory management operations (e.g., error correction, wear leveling, etc.), the NVM packages 212a-b may be considered to be "managed" NVM.

The system 200 is depicted as also including an external device 214 that can be communicatively connected (directly and/or indirectly) to the memory device 202. Communication between the external device 214 and the memory device 202 can include the transmission of data and/or instructions between the two devices. The external device 214 can be any of a variety of electronic devices, such as a desktop computer, a laptop computer, and a media computing device (e.g., a media server, a television, a stereo system). The memory device 202 can communicate with the external device 214 through a physical and/or wireless connection using an external device interface 216 (e.g., wireless chip, USB interface, etc.).

For instance, in one example implementation the memory device 202 can be a portable media player (e.g., an IPOD) and the external device 214 can be a desktop computer that can transmit media files (e.g., audio files, video files, etc.) to each other over a physical connection (e.g., USB cable).

Figure 3:
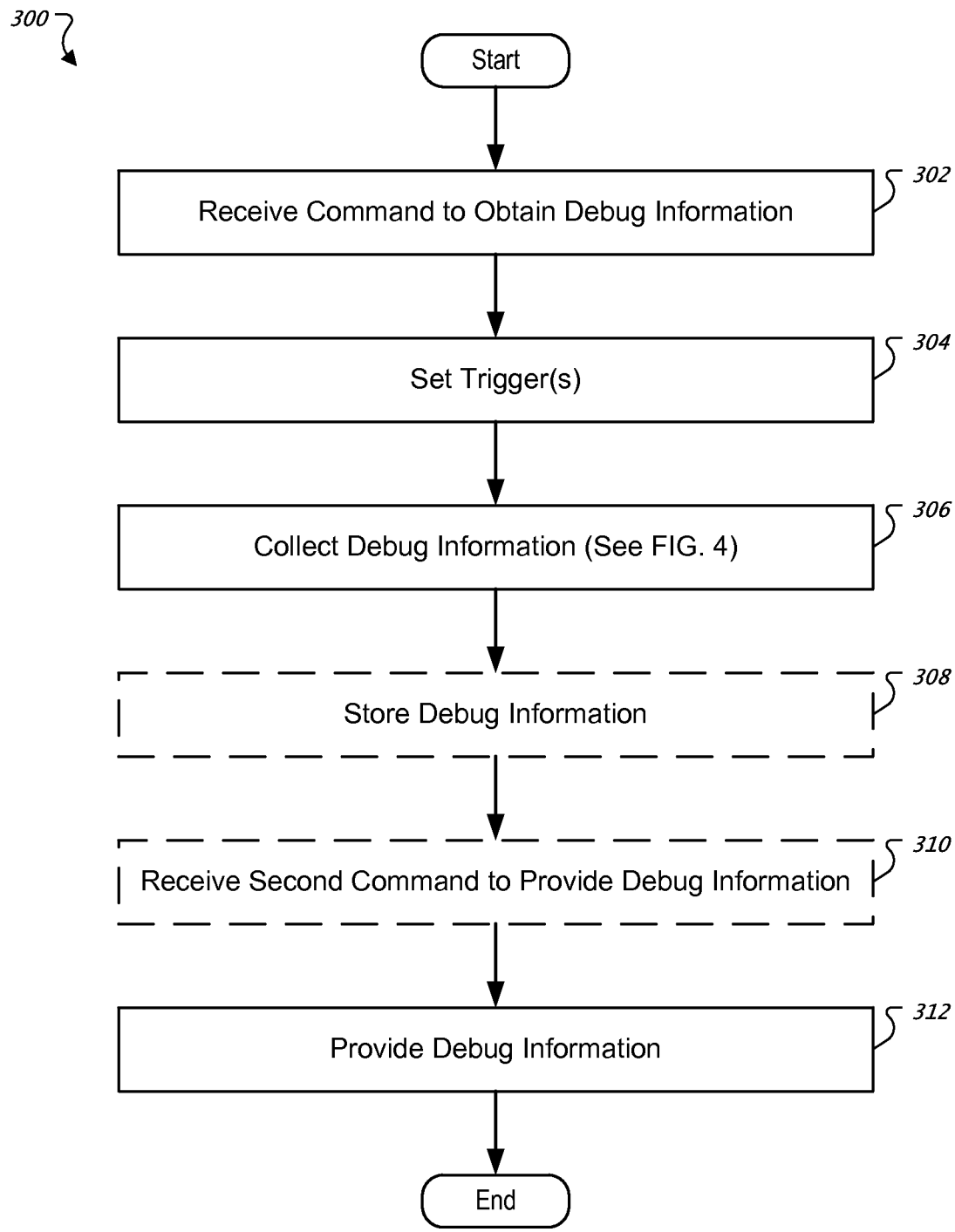
FIG. 3 is a flowchart depicting an example process for collecting and providing debug information by a memory device.

FIG. 3 is a flowchart depicting an example process 300 for collecting and providing debug information by a memory device. The process 300 can be performed by a variety of memory devices, such as the NVM package 104 described above with regard to FIG. 1, and/or the memory device 202 described above with regard to FIG. 2. In particular, the process 300 can be performed by a memory controller, such as the memory controller 116 described above with regard to FIG. 1

The technique 300 begins by receiving a command to obtain debug information (at 302). For example, the NVM package 104 can receive the command 106 through the connection 110 with the host 102 and the host interface 114. The command 106 can be received by the memory controller 116 of the NVM package 104 and can request that debug information be collected. The host 102 can request that the NVM package 104 collect only specific debug information with the command 106, such as debug information pertaining to memory operations regarding a particular address and/or to failed memory operations (e.g., failed read, erase, write operations) regarding any address.

Based on the received command, one or more triggers can be set (at 304). Triggers can be set by a memory controller (e.g., the memory controller 116) and can be used to determine when to collect debug information during operation of a memory device. For instance, triggers can be set to collect debug information related to: specific memory addresses (e.g., information regarding memory operations pertaining to particular memory pages/blocks/dies), operational failures of a memory device (e.g., read failure, excessive operational temperature of a memory device, etc.), invalid operations (e.g., memory operations pertaining to out of range addresses), particular conditions within the memory device (e.g., temperature, available voltage), particular operations and/or sequences of operations (e.g., read operation, erase operation, program operation), and any combination thereof.

Triggers can be set such that they will cause a memory controller to collect debug information when criteria specified by the triggers (e.g., particular memory address, operational failure) are satisfied. For example, the memory controller 116 can set the triggers 126 in the registers 120 and/or the triggers 128 in the volatile memory 122.

Triggers can be designated by a host from which a command is received and/or by a memory controller. For example, the host 102 can provide trigger values with the command 106 that the memory controller 116 can use to set the triggers 126 and/or 128. In another example, in response to receiving the command 106, the memory controller 116 can determine various triggers that should be set and can generate trigger values for the triggers 126 and/or 128.

At 306, debug information can be collected in response to receiving the command to obtain debug information. For example, the memory controller 116 can collect debug information associated with operation of the NVM package 104. Debug information can be collected based on one or more triggers, such as the triggers 126 and/or 128 described above with regard to FIG. 1. Collected debug information can include a variety of details regarding operation of a memory device, such as a memory address to which an operation pertains (e.g., page/block/die identifier), whether or not an error occurred with regard to the operation, and an error code associated with any such error. Multiple triggers can be used to collect debug information. Various logic operators can be used with multiple triggers to determine whether to collect debug information, such as an AND, OR, and/or XOR operators.

Debug information can also be collected without triggers having been set. For instance, based on the command 106 the memory controller 116 can collect all debug information associated with the NVM package 104. Such collection can be performed for a particular time period (e.g., the command 106 can specify a time period), until a particular condition is encountered (e.g., an error encountered), and/or until a subsequent command is received indicating that collection of debug information should stop. An example technique for collecting debug information is described below with regard to FIG. 4.

In some implementations, collected debug information can be stored (at 308). For example, the memory controller 116 can store debug information in the volatile memory 122 (as indicated by the debug information 130) and/or in the NVM 124 (as indicated by the debug information 134).

In some implementations, a second command to provide debug information is received (at 310). For example, the NVM package 104 can obtain debug information as requested in a command from the host 102 and wait to provide the collected debug information to the host 102 until another command requesting the debug information is received from the host 102. Such a second command can specify particular debug information, such as debug information pertaining to a particular portion of NVM. For instance, the host 102 can request collected debug information pertaining to the NVM 140a of the memory die 0 (138a). In another example, the host 102 can request collected debug information related to operational failures of the NVM package 104.

Collected debug information can be provided to a host device (at 312). For example, the memory controller 116 can provide collected debug information to the host 102 in response to receiving a second command from the host 102 requesting such information. In another example, the memory controller 116 can provide debug information to the host 102 as it is collected without first waiting for a second command from the host 102.

Figure 4:
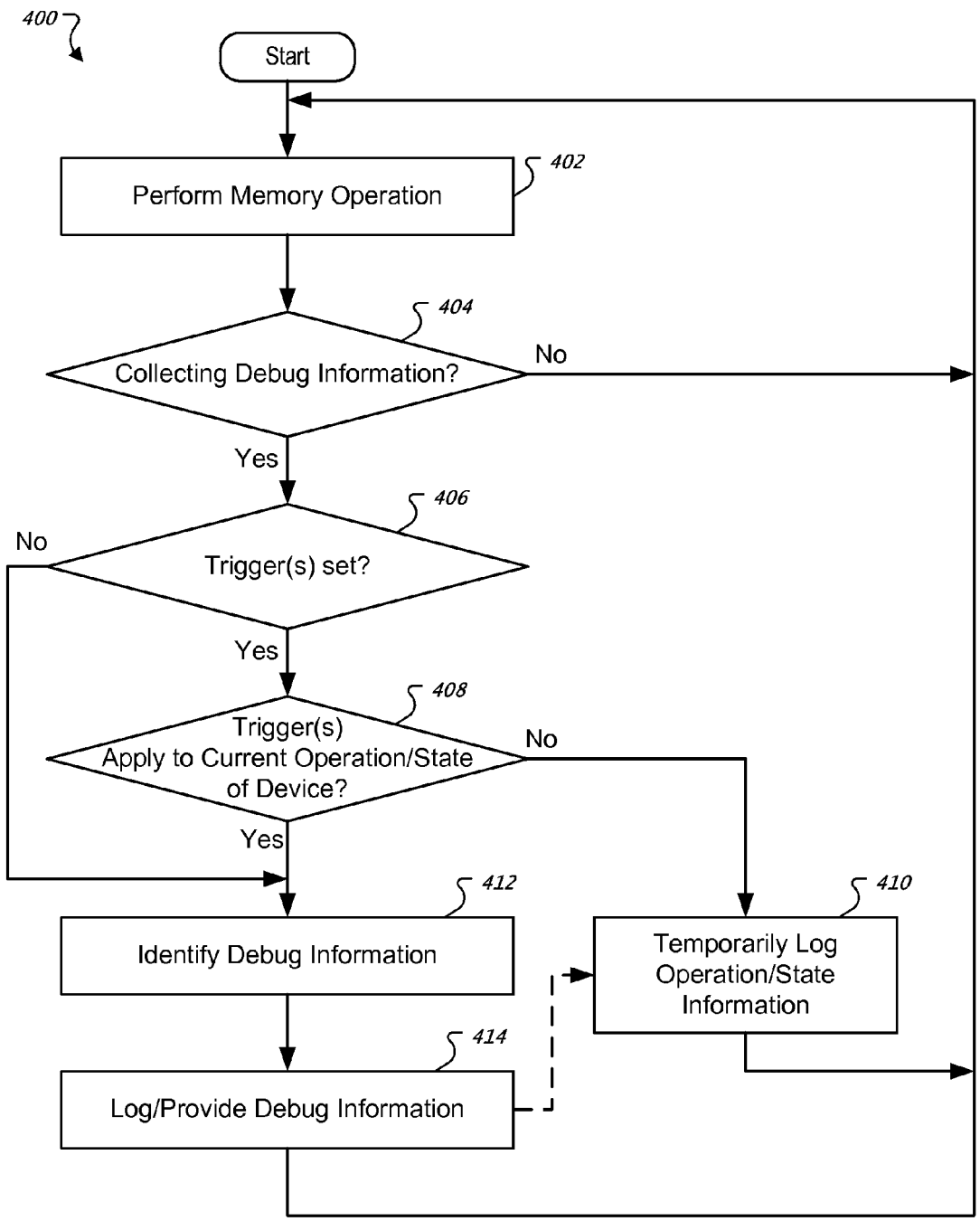
FIG. 4 is a flowchart depicting an example process for collecting debug information by a memory device.

FIG. 4 is a flowchart depicting an example process 400 for collecting debug information by a memory device. The process 400 can be performed by a variety of memory devices, such as the NVM package 104 described above with regard to FIG. 1, and/or the memory device 202 described above with regard to FIG. 2. In particular, the process 400 can be performed by a memory controller, such as the memory controller 116 described above with regard to FIG. 1.

In accordance with the process 400, a memory operation is performed at 402. For example, the memory controller 116 can read, program, and/or erase a page of memory from the NVM 140a over the internal bus 136. In conjunction with performing the memory operation (before, during, or after performing the memory operation), a determination can be made as to whether debug information is being collected (at 404). For example, the memory controller 116 can determine whether the NVM package 104 has been commanded to collect debug information by the host 102. If the NVM package 104 has been instructed to collect debug information, the memory controller 116 can set a flag indicating such. Determining whether to collect debug information can include checking whether such a flag is set, such as checking a designated register in the registers 120.

If the debug information is not being collected, then more memory operations can be performed (at 402). If debug information is being collected, then a determination can be made as to whether any triggers have been set (at 406). As described above with regard to operation 304, triggers can be used to determine when to collect debug information and can be set by the memory controller 116 based on commands received from the host 102. If one or more triggers are set, then a determination can be made as to whether any of the set triggers apply to the current memory operation and/or state of the memory device (at 408). For example, if a trigger is set to collect debug information pertaining to memory die 138b, determining determination can be made as to whether the memory operation performed at 402 pertains to a physical address associated with memory die 138b.

If a trigger applies to the current memory operation and/or state of the memory device (at 412), or if no triggers are determined to be set (at 406), then debug information can be identified (at 412). As discussed above, debug information can include a variety of information regarding a memory device that may be useful to debug operation of the device, such as information pertaining a current memory operation (e.g., type of operation, associated memory address, current register values), information pertaining to memory operations preceding the current memory operation (e.g., sequence of operations performed by the memory device), and/or conditions associated with the memory device (e.g., temperature, available voltage).

The identified debug information can be logged and/or provided (at 414). For example, the memory controller 116 can stored identified debug information in the volatile memory 122 and/or the NVM 124. Such stored debug information can be provided by the memory controller 116 to the host 102 in response to a command for the debug information from the host 102. The debug information can also be provided to the host 102 by the memory controller 116 as the debug information is identified.

If triggers are set but it is determined at 408 that none of the set triggers apply to the current memory operation and/or state of the memory device, then information regarding the memory operation and/or state of the device can be temporarily logged (at 410). For example, the memory controller 116 can maintain a temporary log of the previous 10, 20, 50, etc. operations performed by the NVM package 104. Such a temporary log can provide context to any errors that are encountered by the NVM package 104 during operation (e.g., provide a sequence of operations that led to an encountered error). Such temporary logging may also be performed when debug information is being logged, as indicated by the dashed arrow connecting operation 414 to operation 410.

After performing temporary logging at 410 and/or logging or providing identified debug information at 414, the process 400 can repeat and additional memory operation can be performed at 402. A variety of end conditions not depicted in FIG. 4 can be used with the process 400, such as ending the process 400 if a critical error is encountered and/or operating conditions for the device are potentially hazardous to the device (e.g., excessive heat detected).

Figure 5:
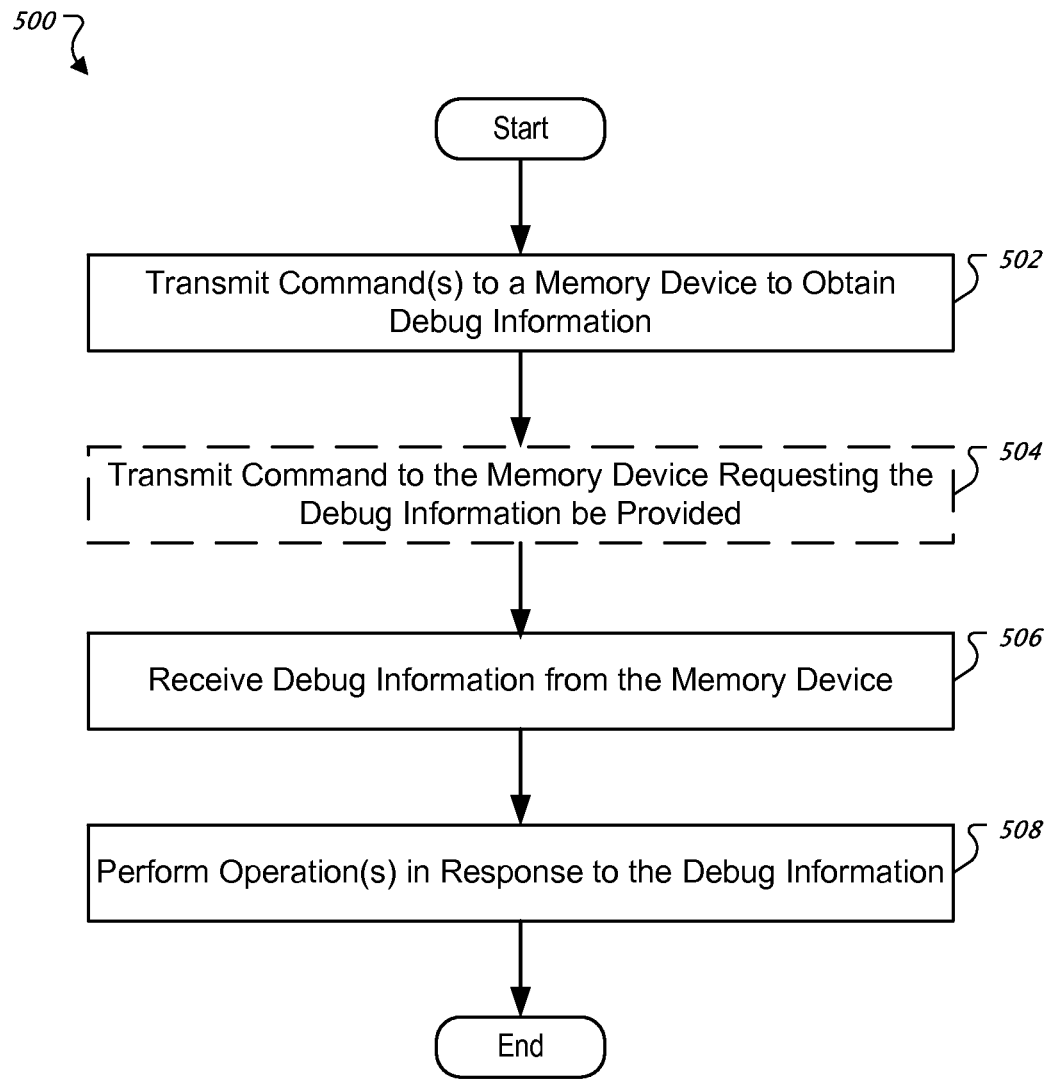
FIG. 5 is a flowchart depicting an example process for obtaining debug information from a memory device.

FIG. 5 is a flowchart depicting an example process 500 for obtaining debug information from a memory device. The process 500 can be performed by a variety of memory devices, such as the host 102 described above with regard to FIG. 1, and/or the memory device 202 described above with regard to FIG. 2. In particular, the process 500 can be performed by a host controller, such as the host controller 112 described above with regard to FIG. 1 and/or the host controller 204 described above with regard to FIG. 2.

One or more commands are transmitted to a memory device to obtain debug information at 502. For example, the host 102 can transmit the command 106 to the NVM package 104 to request the NVM package 104 to obtain debug information. The commands transmitted to the memory device can include information identifying various triggers that the memory device should use for collecting the debug information. The commands can include trigger values that the memory device can insert into one or more registers (e.g., the registers 120) and/or volatile memory (e.g., the volatile memory 122). The one or more commands transmitted to the memory device can cause the memory device to collect debug information as outlined in the commands.

In some implementations, one or more commands can be transmitted to the memory device requesting that the debug be provided at 504. For example, the host 102 can provide a second command to the NVM package 104 requesting that the collected debug information be provided to the host 102.

Debug information can be received from the memory device at 506. The debug information can be received as the debug information is being collected and/or in response to a command for the memory device to provide the debug information.

Various operations can be performed in response to receiving the debug information at 508. For example, the debug information can be analyzed by the host controller 112 to determine whether the NVM package 104 is malfunctioning in some way. For instance, if the memory die 138b is determined to be faulty, the host 102 can instruct the NVM package 104 to disable the memory die 138b and/or to redundantly store data from the memory die 138b in the other memory dies 138a and 138c-n. In another example, the host controller 112 can modify debug triggers provided to the NVM package 104 based on the received debug information and can perform additional iterations of the process 500.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. Moreover, other mechanisms for obtaining debug information may be used. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
  receiving, from a host through a host interface of a memory device, a first command instructing the memory device to obtain debug information associated with the memory device, wherein the memory device includes non-volatile memory;
  wherein the debug information includes information identifying one or more memory operations performed by the memory device, and information identifying a portion of the memory device in which an error occurred during the memory operations;
  storing, by the memory device, the collected debug information in response to the received command;
  collecting, by a memory controller of the memory device, the debug information during operation of the memory device in response to receiving the command;
  receiving, from the host through the host interface, a second command to provide the host with at least the portion of the collected debug information; and
  providing at least a portion of the collected debug information to the host through the host interface in response to the received request.

2. The method of claim 1, further comprising, based on the received first command, setting one or more triggers that the memory controller uses to determine when to collect the debug information during operation of the memory device.

3. The method of claim 2, wherein the one or more triggers include a trigger to collect the debug information during memory operations pertaining to one or more memory addresses.

4. The method of claim 3, wherein the one or more memory addresses are associated with a page of the non-volatile memory, and wherein the first trigger causes the collected debug information to be associated with the page.

5. The method of claim 2, wherein the one or more triggers include a trigger to collect the debug information in association with one or more of a failed read operation, failed program operation, and a failed erase operation on the non-volatile memory.

6. The method of claim 2, wherein the one or more triggers include a trigger to collect the debug information in response to an instruction to perform a memory operation on a memory address that is invalid for the non-volatile memory.

7. The method of claim 2, wherein the one or more triggers are defined in the received command or by the host.

8. The method of claim 2, wherein the one or more triggers each include a set of criteria that describe one or more states of the memory device.

9. The method of claim 1, wherein the collected debug information includes information identifying one or more memory addresses to which the collected debug information pertains, and wherein the portion of the collected debug information requested in the second command includes debug information pertaining to one or more memory addresses.

10. The method of claim 1, wherein the debug information is provided to the host as the debug information is collected by the memory controller.

11. The method of claim 1, wherein the debug information includes information identifying one or more memory operations performed by the memory device, and information identifying a portion of the memory device in which an error occurred during the memory operations.

12. A method comprising:
transmitting, by a host, a first command to a memory device that includes a memory controller and non-volatile memory, wherein the first command instructs the memory device to collect and store debug information associated with the memory device;
transmitting, by the host, a second command to provide the host with at least a portion of the collected debug information;
receiving, at the host, at least a portion of the debug information collected by the memory device in response to the second command; and
performing, by the host, one or more operations in response to the received debug information.

13. The method of claim 12, wherein the first command includes trigger information identifying one or more triggers that the memory controller uses to determine when to collect the debug information during operation of the memory device.

14. The method of claim 13, wherein the trigger information includes one or more of a register value to be programmed to a register of the memory device, and instructions to be programmed to volatile memory of the memory device.

15. The method of claim 12, wherein performing the one or more operations includes performing an operation that causes at least a portion of the memory device to be reset.

16. A memory device comprising:
non-volatile memory;
a host interface that communicatively connects the memory device to a host; and
a memory controller that is configured to perform memory operations on the non-volatile memory and that communicates with the host through the host interface, wherein the memory controller is further configured to:
receive, from the host through the host interface, a first command to obtain debug information associated with the memory device and the non-volatile memory;
collect debug information stored by the memory device during operation of the memory device in response to receiving the first command;
receive, from the host through the host interface, a second command to provide the host with at least the portion of the collected debug information; and
provide at least a portion of the collected debug information to the host through the host interface in response to the received request.

17. The memory device of claim 16, wherein the memory controller is further configured to set one or more triggers that the memory controller uses to determine when to collect the debug information during operation of the memory device.

18. The memory device of claim 17, wherein the one or more triggers include a trigger to collect the debug information during memory operations pertaining to one or more memory addresses.

19. The memory device of claim 17, wherein the one or more triggers include a trigger to collect the debug information in association with one or more of a failed read operation, failed program operation, and a failed erase operation on the non-volatile memory.

20. The memory device of claim 17, wherein the one or more triggers include a trigger to collect the debug information in association with a received or generated instruction to perform a memory operation pertaining to a memory address that is invalid with regard to the non-volatile memory.

21. The memory device of claim 16, wherein the non-volatile memory includes one or more flash memory dies.

22. A system comprising:
non-volatile memory; and
a memory controller that is configured to perform memory operations on the non-volatile memory and that communicates with a host through a host interface, wherein the memory controller is further configured to:
receive, from the host through the host interface, a first command to obtain debug information associated with the memory device and the non-volatile memory;
collect debug information stored by the memory device during operation of the memory device in response to receiving the first command; and
receive, from the host through the host interface, a second command to provide the host with at least the portion of the collected debug information; and
provide at least a portion of the collected debug information to the host through the host interface in response to the received request.

23. The system of claim 22, wherein the memory controller is further configured to set one or more triggers that the memory controller uses to determine when to collect the debug information during operation of the memory device.

24. The system of claim 23, wherein the one or more triggers include a trigger to collect the debug information during memory operations pertaining to one or more memory addresses.

25. The system of claim 23, wherein the one or more triggers include a trigger to collect the debug information in association with one or more of a failed read operation, failed program operation, and a failed erase operation on the non-volatile memory.

26. The system of claim 23, wherein the one or more triggers include a trigger to collect the debug information in association with a received or generated instruction to perform a memory operation pertaining to a memory address that is invalid with regard to the non-volatile memory.

* * * * *